United States Patent
Harmeyer et al.

(10) Patent No.: US 11,598,305 B2
(45) Date of Patent: Mar. 7, 2023

(54) ENGINE IDLING REDUCTION SYSTEM (71) Applicant: Caterpillar Inc., Peoria, IL (US)

(72) Inventors: Keith Harmeyer, Lafayette, IN (US); Michael E. Kenning, Zionsville (IN); Navya X. Koka, Dunlap, IL (US); Matthew E. Lueddecke, Germantown Hills, IL (US); Jon B. Borgeson, Washington, IL (US)

(73) Assignee: Caterpillar Inc., Peoria, IL (US)

(*) Notice: Subject to any disclaimer, the term of this patent is extended or adjusted under 35 U.S.C. 154(b) by 7 days.

(21) Appl. No.: 16/698,477

(22) Filed: Nov. 27, 2019

(65) Prior Publication Data
US 2021/0156351 A1   May 27, 2021

(51) Int. Cl.
*F02N 11/08* (2006.01)
*F02D 41/06* (2006.01)

(52) U.S. Cl.
CPC ........ *F02N 11/0825* (2013.01); *F02D 41/062* (2013.01); *F02N 11/0862* (2013.01);
(Continued)

(58) Field of Classification Search
CPC ............. F02N 11/0825; F02N 11/0862; F02D 41/062; F02D 2200/061; F02D 2200/024;
(Continued)

(56) References Cited

U.S. PATENT DOCUMENTS 5,454,229 A * 10/1995 Hanson ................ B60H 1/3208
62/126
6,371,889 B1   4/2002 Kuroda et al.
(Continued)

FOREIGN PATENT DOCUMENTS

DE   102012100250 A1   7/2012
FR   2966119 A1   4/2012
(Continued)

OTHER PUBLICATIONS

Martin, William A. and McGuckin, Nancy A. Report 365 Travel Estimation Techniques for Urban Planning. National Academy Press. p. 26 (Year: 1998).*

*Primary Examiner* — Phutthiwat Wongwian
*Assistant Examiner* — Joshua Campbell
(74) *Attorney, Agent, or Firm* — Bookoff McAndrews, PLLC (57) ABSTRACT

In one aspect, a method for controlling an engine system includes starting the engine system, activating an engine idling reduction mode allowing automatic shutdown and automatic restarting of an engine, disallowing automatic shutdown of the engine within the engine idling reduction mode if a state of charge of a voltage source is below a charge limit for permitting automatic shutdown of the engine, and modifying the charge limit as a function of a number of starts of the engine. Other aspects include a method for disallowing automatic shutdown of an engine if a voltage source has not achieved a fully charged condition, a method of triggering an automatic restarting of an engine, if the engine is automatically shutdown, based on at least two separate indicators of engine temperature, and a method of disallowing automatic shutdown of an engine if ambient temperature is less than a predetermined value.

22 Claims, 6 Drawing Sheets (52) U.S. Cl.
CPC .. *F02D 2200/021* (2013.01); *F02D 2200/023* (2013.01); *F02D 2200/0414* (2013.01); *F02D 2200/503* (2013.01); *F02N 2200/023* (2013.01); *F02N 2200/024* (2013.01); *F02N 2200/061* (2013.01)

(58) Field of Classification Search
CPC ........ F02D 2200/023; F02D 2200/503; F02D 2200/0414; F02D 2200/021
See application file for complete search history.

(56) References Cited

U.S. PATENT DOCUMENTS

| | | | |
|---|---|---|---|
| 6,532,926 | B1 | 3/2003 | Kuroda et al. |
| 6,817,329 | B2 | 11/2004 | Buglione et al. |
| 7,497,195 | B2 | 3/2009 | Umezu et al. |
| 7,558,666 | B2 | 7/2009 | DiGonis |
| 7,694,764 | B2 | 4/2010 | Sasaki |
| 8,401,769 | B2 | 3/2013 | Yu et al. |
| 8,627,797 | B2 | 1/2014 | Renner |
| 9,181,915 | B2 | 11/2015 | Dupuy |
| 9,216,731 | B2 | 12/2015 | Tanishima et al. |
| 10,190,518 | B2 | 3/2019 | Ito |
| 2010/0006078 | A1 | 1/2010 | Shoda |
| 2010/0076634 | A1 | 3/2010 | Brigham |
| 2010/0131152 | A1 | 5/2010 | Castonguay et al. |
| 2010/0300414 | A1* | 12/2010 | Pursifull ................. F04B 49/02 123/559.1 |
| 2013/0054060 | A1* | 2/2013 | Dupuy .................... F02D 17/04 701/22 |
| 2014/0041828 | A1 | 2/2014 | Yoshida |
| 2014/0088854 | A1* | 3/2014 | Smague ................. F02D 45/00 701/112 |
| 2015/0159613 | A1 | 6/2015 | Jensen et al. |
| 2015/0166046 | A1* | 6/2015 | Kondo ................ F02N 11/0825 701/22 |
| 2015/0226171 | A1 | 8/2015 | Kees et al. |
| 2016/0311435 | A1 | 10/2016 | Ogata et al. |
| 2017/0080919 | A1* | 3/2017 | Follen ................. F02N 11/0837 |
| 2017/0253132 | A1* | 9/2017 | Henningson ........ B60L 11/1811 |
| 2017/0363026 | A1 | 12/2017 | Slabaugh et al. |
| 2018/0306158 | A1* | 10/2018 | Books .................. F02N 11/108 |
| 2019/0040832 | A1 | 2/2019 | Namiki et al. |

FOREIGN PATENT DOCUMENTS

| | | | | | |
|---|---|---|---|---|---|
| JP | 2004169578 | A | * | 6/2004 | ......... F02N 11/0829 |
| JP | 2006307661 | A | * | 11/2006 | ......... F02N 11/0866 |
| JP | 2007120448 | A | * | 5/2007 | |
| JP | 2007218107 | A | * | 8/2007 | ......... F02N 11/0825 |
| JP | 5149869 | B2 | | 2/2013 | |
| JP | 5910211 | B2 | | 4/2016 | |
| KR | 20070070735 | A | * | 7/2007 | |
| WO | 2016027155 | A1 | | 2/2016 | |

* cited by examiner

ENGINE IDLING REDUCTION SYSTEM

TECHNICAL FIELD

The present disclosure relates generally to an engine idling reduction system, and more particularly to an engine idling reduction system that maintains engine readiness using algorithms.

BACKGROUND

Well service engines, such as those used in machinery for performing oil or gas extraction, enter long periods of idle, resulting in wasted fuel and wear on parts of the engine. For example, a well service engine used in extracting natural gas may idle for approximately thirty minutes to one hour while the well is prepared for the next fracturing stage. There is a need, therefore, for a control system that allows for a reduction in engine idling to reduce fuel waste and to prolong the life of parts of the engine and, therefore, to minimize disruption in use of the well service engine, while also maintaining engine readiness.

In developing such a control system, certain aspects of well service engines must be taken into account to protect parts of the engine and to avoid disruption and/or complete shutdown of the engine. For example, when a well service engine is used on equipment frequently used in freezing temperatures, the control system will need to ensure the well service engine stays warm, to allow for immediate restart and to ensure engine readiness. In addition, keeping the engine batteries charged is important to avoid disruption of and/or maintain the ability to start the engine. Because well service engines typically use metal bearings, it may also be necessary to track the number of starts of the engine to monitor the remaining life of the metal bearings and to minimize the number of restarts.

German Patent Publication No. DE102012100250 A1, discloses a device having a start number calculation unit that computes a weighted start count of an engine using a weighting factor, and a stop controlling unit that restricts an automatic stop of the engine based on the weighted start count. While the '250 publication discloses a device for tracking a number of starts of an engine, and disallowing automatic stop of the engine under certain conditions, the disclosed device does not account for fuel consumption or a battery state of charge while the device is in an engine idling reduction mode.

The engine idling reduction system of the present disclosure may solve one or more of the problems set forth above and/or other problems in the art. The scope of the current disclosure, however, is defined by the attached claims, and not by the ability to solve any specific problem.

SUMMARY

In one aspect, a method for controlling an engine system having an engine and a voltage source may include starting the engine system, activating an engine idling reduction mode allowing automatic shutdown and automatic restarting of the engine, disallowing automatic shutdown of the engine within the engine idling reduction mode if a state of charge of the voltage source is below a state of charge limit for permitting automatic shutdown of the engine, and modifying the state of charge limit as a function of a number of starts of the engine.

In another embodiment, a method for controlling an engine system having an engine and a voltage source may include starting the engine system, activating an engine idling reduction mode allowing automatic shutdown of the engine, and automatically shutting down the engine if at least a total energy consumption amount of the voltage source is less than a predetermined energy consumption amount.

In yet another aspect, a method for controlling an engine system having an engine and at least one voltage source may include starting the engine system, activating an engine idling reduction mode allowing automatic shutdown and automatic restarting of the engine, and triggering an automatic restarting of the engine, if the engine is automatically shutdown, based on at least two separate indicators of engine temperature.

In still another aspect, a method for controlling an engine system having an engine and at least one voltage source may include starting the engine system, activating an engine idling reduction mode allowing automatic shutdown of the engine, and disallowing automatic shutdown of the engine within the engine idling reduction mode if the ambient temperature is less than a predetermined value.

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "generally, "substantially," and "approximately" are used to indicate a possible variation of ±10% in the stated value.

DETAILED DESCRIPTION

Figure 1:
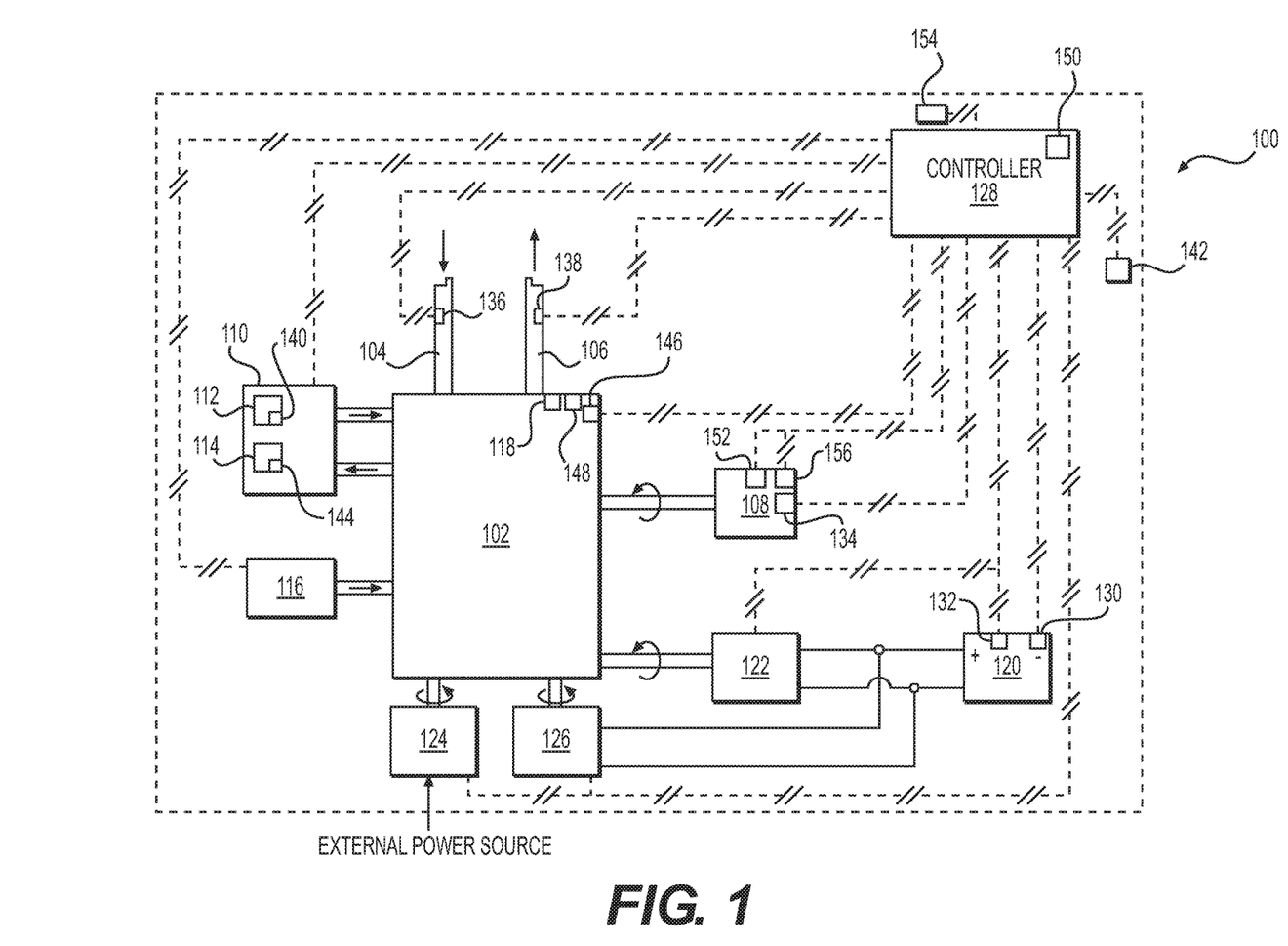
FIG. 1 shows a schematic diagram of an engine system in accordance with the present disclosure.

Referring to FIG. 1, an engine system 100 includes an engine 102 having an intake manifold 104, an exhaust port 106, a transmission assembly 108, an engine cooling unit 110 including a water jacket 112 and a charge air cooling (CAC) assembly 114, a fuel container 116, and a fuel injector 118. The engine system 100 also includes a voltage source 120, such as a battery, an ultra-capacitor, or a fuel cell, for example, an alternator 122, a first starter motor 124, a second starter motor 126, and a controller 128.

The engine 102 may be based on a commonly-applied power generation unit, such as an internal combustion engine (ICE). The engine 102 may include a V-type engine, an in-line engine, or an engine with different configurations, as is conventionally known. Although not limited, the engine 102 may be a spark-ignition engine or a compression ignition engine, which may be applied in construction machines or locomotives. Aspects of the present disclosure are not limited, however, to a particular engine type.

The voltage source 120 is configured to provide electrical energy to operate various electrical equipment of the engine system 100. For example, the voltage source 120 may be a battery that operates the second starter motor 126 for cranking the engine 102. The alternator 122 charges the voltage source 120 using power of the engine 102. In an embodiment, the battery 118 may comprise a lead-acid type battery. Other types of voltage sources capable of operating the electrical equipment in the engine system 100 may, however, be used.

The first starter motor 124 is coupled to a crankshaft of the engine 102, and is configured to start the engine 102 using an external power source. The first starter motor 124 rotates the crankshaft to start the engine 102. In one embodiment, the first starter motor 124 may be a hydraulic starter motor. The second starter motor 126 is coupled to the crankshaft in a similar manner as is the first starter motor 124. In one embodiment, the second starter motor 126 corresponds to an electric starter motor that receives power from the battery 120 to rotate the crankshaft to start the engine 102.

Figure 2:
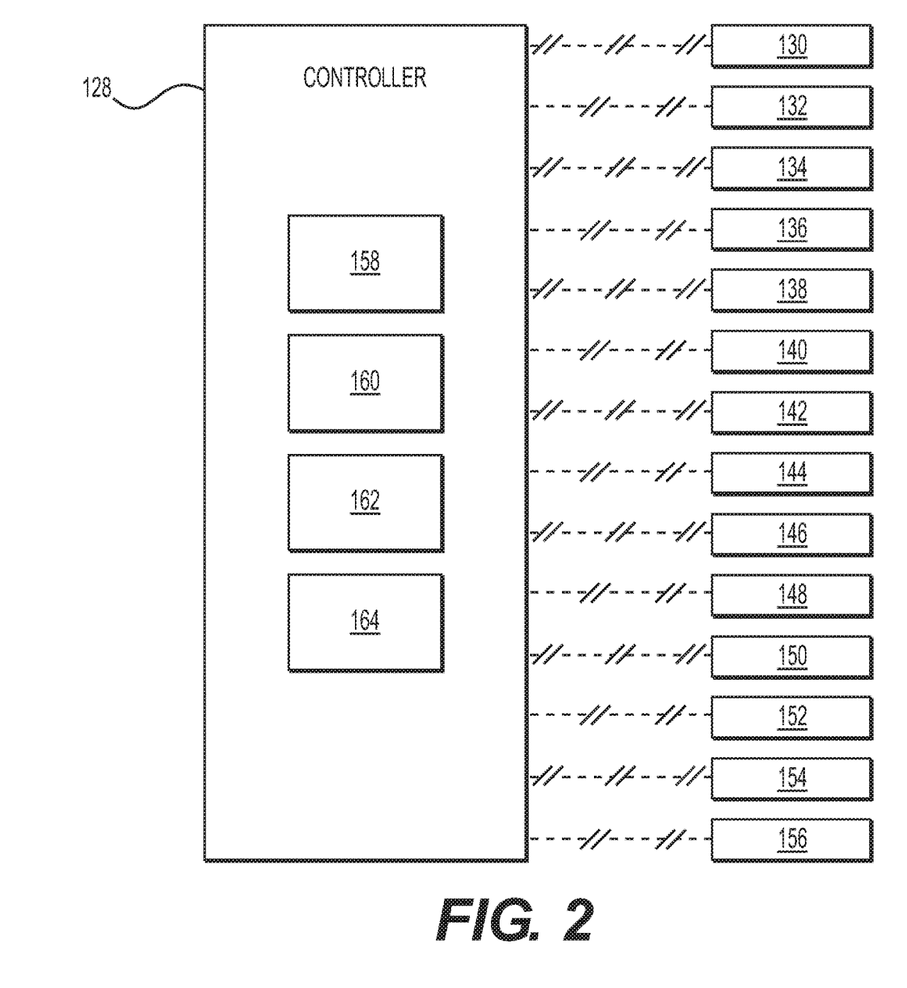
FIG. 2 shows a schematic diagram of an engine idling reduction system, in accordance with the present disclosure.

As shown in FIG. 1 and FIG. 2, the controller 128 is connected to one or more sensors and indicators provided in or associated with the engine system 100 to monitor specific conditions of the engine system 100. In particular, the engine system 100 includes at least a battery current sensor 130 provided in or associated with the battery 120 and configured to measure a current output by the battery 120, and to output a discharge current, a charging current, or a state of charge (SOC) of the battery 120. In addition, a battery voltage sensor 132 is provided in or associated with the battery 120 and is configured to measure a voltage of the battery 120. In addition, a transmission oil temperature sensor 132 is provided in or associated with the transmission assembly 108 to measure a temperature of the oil flowing through the transmission assembly 108. An intake manifold air temperature (IMAT) sensor 136 is provided in or associated with the intake manifold 104 to measure an IMAT value, and a exhaust temperature sensor 138 provided in or associated with the exhaust port 106 measures a temperature of the exhaust gas passing through the exhaust port 106. A water jacket temperature sensor 140 is provided in or associated with the water jacket 112 to measure a temperature of the water jacket 112. An ambient temperature sensor 142 is provided in or associated with the engine system 100 and exposed to ambient air to measure ambient air temperature. A charge air cooling (CAC) temperature sensor 144 is provided in or associated with the CAC assembly 114 to measure a CAC temperature of air in the CAC assembly 114.

An engine speed sensor 146 is provided in or associated with the engine 102 to measure a number of rotations per minute of the crankshaft of the engine 102, and an engine oil temperature sensor 148 is provided in or associated with the engine 102 to measure a temperature of oil in the engine 102. The controller 128 determines a fuel consumption of the engine 102 based on fuel injector activation of the fuel injector 118. In addition, the controller 128 determines when a start has occurred based on a number of starts of both the first starter motor 124 and the second starter motor 126. Further, a timer 150 may be connected to the battery 120 and is configured to measure an amount of time beginning when the battery 120 is powered off or on. In some embodiments, the transmission oil temperature sensor 134, the IMAT sensor 136, the water jacket temperature sensor 140, the ambient temperature sensor 142, the CAC temperature sensor 142, and the engine oil temperature sensor 148 may comprise a known type of temperature sensor, including, but not limited to, a thermistor, a thermocouple, and a silicon bandgap temperature sensor. In addition, the sensors described above may be of the types generally used in engine systems.

Indicators, such as a flag 152 that indicates whether a last prelube was successful, an override indicator 154 regarding whether an operator override is active, and a gear state indicator 156 of a gear state of the transmission assembly 108, e.g., park, drive, etc., are also connected to the controller 128.

Referring to FIG. 2, the controller 128 also includes an engine idling reduction system 158 that is connected to the sensors and indicators, and that receives signals in the form of outputs from the sensors and indicators. The engine idling reduction system 158 enters engine idling reduction mode when certain conditions have been met, in order to reduce idling of the engine 102, while maintaining engine readiness. For example, for engines operated over 40% in an idle condition during a work cycle, such as well service engines, the engine idling reduction mode may be used to automatically shutdown the engine under certain conditions. After the engine 102 has entered the engine idling reduction mode, the engine 102 may turn off when certain conditions (i.e., shutdown conditions) are met, and will restart when other conditions (i.e., restart conditions) are met. In addition, as described in more detail below, the engine 102 may be prevented from shutting down by deactivating the engine idling reduction mode, for example, when certain conditions are met indicating that the engine 102 must remain on.

The controller 128 also includes at least a memory device 160, a processor 162, and a transceiver device 164. The memory device 160 includes suitable logic, circuitry, interfaces, and/or code that may be configured to store the set of instructions, which are executed by the processor 162. In an embodiment, the memory device may be configured to store one or more programs, routines, or scripts that may be executed in coordination with the processor to perform the methods 300-600, shown in FIGS. 3-6, respectively. The memory device 160 also stores limit values, including a battery state of charge (SOC) limit for allowing automatic shutdown of the engine 102 when the engine 102 is in the engine idling reduction mode (hereafter referred to simply as battery SOC limit). As is described herein, the battery SOC limit may be adjusted in order to reduce idle and to ensure engine readiness. The memory device 160 may be implemented based on a Random Access Memory (RAM), a Read-Only Memory (ROM), a Hard Disk Drive (HDD), a storage server, and/or a Secure Digital (SD) card.

The processor 162 reads and executes the set of instructions to control the engine idling reduction system 158 to perform the methods 300-600, shown in FIGS. 3-6, respectively. The controller 128 is configured to control the operation of the engine 102, and, in particular, of the engine idling reduction system 158, based on the outputs from the sensors and indicators, and the programs executed by the processor 162. Examples of the processor 162 include, but are not limited to, an X86-based processor, a Reduced Instruction Set Computing (RISC) processor, an Application-Specific Integrated Circuit (ASIC) processor, a Complex Instruction Set Computing (CISC) processor, and/or another processor. The transceiver 166 includes suitable logic, circuitry, interfaces, and/or code that may be configured to receive data from the sensors and the counter of the engine system 100.

INDUSTRIAL APPLICABILITY

The controller 128, and, in particular, the methods executed by the controller 128, including operation (i.e., activation and deactivation) of the engine idling reduction system 158, reduce idle of engines while maintaining engine readiness. The function of the controller 128 in this regard may be particularly advantageous for engines that operate in an idle condition for over 40% of a work cycle, such as well service engines.

FIG. 3, FIG. 4, FIG. 5, and FIG. 6 show flowcharts for methods executed by the controller 128 in controlling the engine idling reduction system 158 of the engine system 100.

Figure 3:
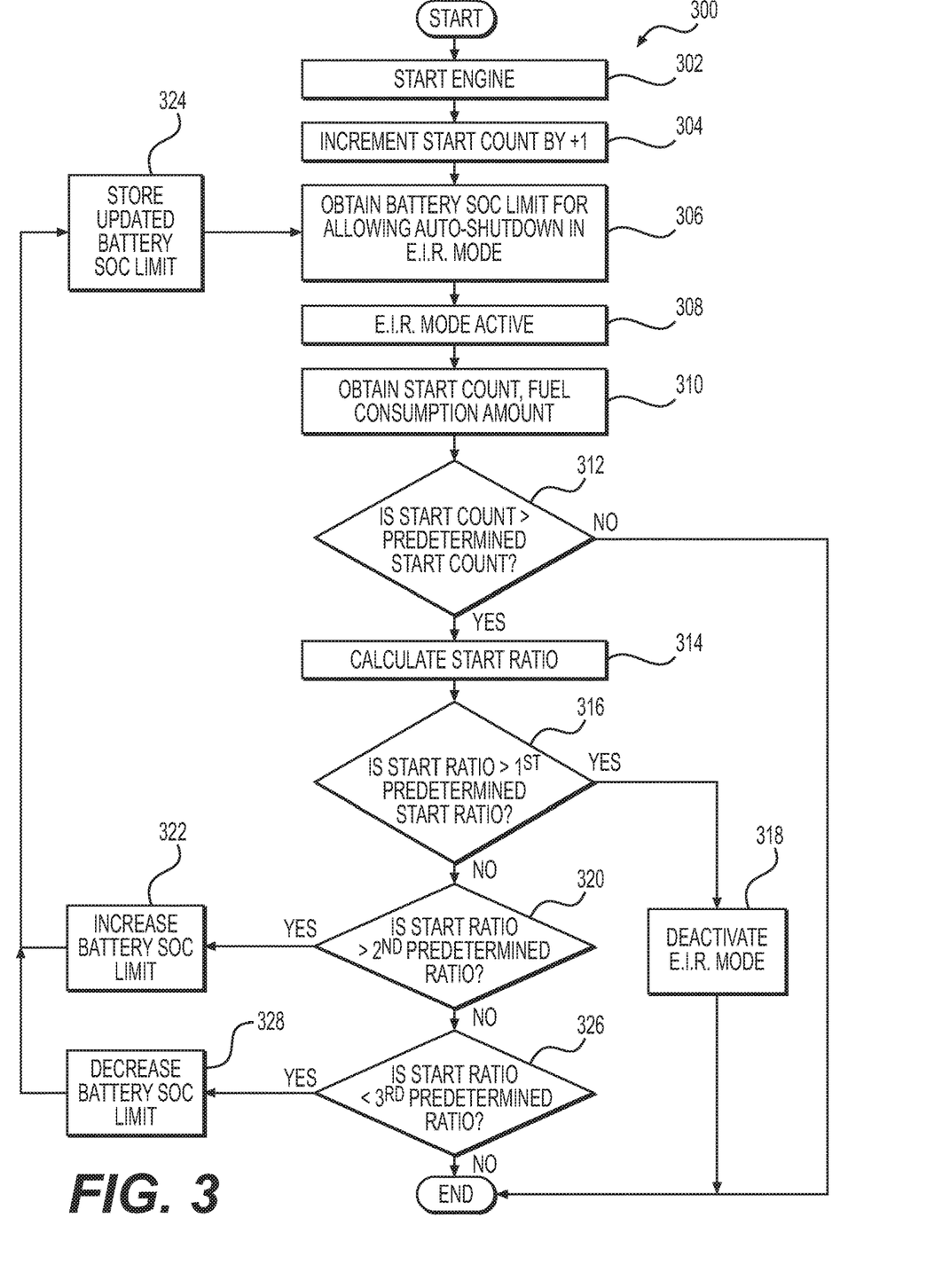
FIG. 3 shows a flowchart of a method for determining if a start limit of an engine of the engine system is too high.

Referring to FIG. 3, a method 300 for determining if a start limit of the engine 102 is too high is described. This method 300 is used, in particular, to modify a battery SOC limit of the battery 120, which is used in determining whether the engine 102 is permitted to shutdown in the engine idle reduction mode. That is, the method 300 adjusts the value of the battery SOC limit to thereby control shutdown of the engine 102. By controlling shutdown of the engine 102 in this manner, it is possible to reduce a number of shutdowns, and, therefore, a number of restarts of the engine 102, in order to reduce wear on components of the engine system 100, including the first starter motor 124 and the second starter motor 126. In step 302, the engine 102 is started. In an embodiment, the controller 128 is configured to start the engine 102 using the first starter motor 124, but the engine 102 may also be started using the second starter motor 126. In the example described below, the first starter motor 124 and an associated first motor start count are described, but the method may also apply to the second starter motor 126 and an associated second motor start count, and to both the first starter motor 126 and the second starter motor 126 and the respective motor start counts.

At step 304, the controller 128 increments a start count, which was stored before the engine 102 was lasted keyed off, by 1 to accumulate a total start count. The accumulated total start count may also be stored in the memory device 160 during this step. At step 306, the controller 128 obtains a battery SOC limit from the memory device 160. Next, at step 308, the controller 128 activates the engine idling reduction system 158, operating the engine 102 in an engine idling reduction mode, in which the engine 102 is permitted to shutdown automatically, when specific conditions are met. For example, the conditions for activating the engine idling reduction mode may include:
1. the gear state indicator 156 indicates that the transmission assembly 108 is in park,
2. the engine speed sensor 146 indicates that the engine speed is less than a predetermined engine speed (i.e., an engine speed threshold), and
3. the override indicator 154 indicates that operator override of the engine system 100 is not active.

The predetermined engine speed may be, for example, in a range of 700 to 800 rotations per minute.

In step 310, the controller 128 obtains the total start count and a fuel consumption amount. In step 312, the controller 128 determines whether the total start count is greater than a predetermined start count (i.e., a start count threshold). If the total start count is not greater than the predetermined start count, the method 300 ends. On the other hand, if the total start count is greater than the predetermined start count, the method 300 proceeds to step 314, in which the controller 128 calculates a start ratio, which is a ratio of the total start count to the received fuel consumption amount. In step 316, the controller 128 determines whether the start ratio is greater than a first predetermined ratio (i.e., a first ratio threshold). If the start ratio is greater than the first predetermined ratio, in step 318, the controller 128 deactivates the engine idling reduction mode, thereby disallowing automatic shutdown of the engine 102. If the start ratio is not greater than the first predetermined ratio, in step 320, the controller 128 determines whether the start ratio is greater than a second predetermined ratio (i.e., a second ratio threshold), which is less than the first predetermined ratio. If the start ratio is greater than the second predetermined ratio, in step 322, the controller 128 increases the battery SOC limit by a predetermined amount of, for example, 1 amp-hour. More specifically, the controller 128 decreases a current charge setpoint of the battery 120, and, therefore, increases the battery SOC limit. Next, in step 324, the controller 128 stores the increased battery SOC limit in the memory device 160 as the battery SOC limit, and the method 300 returns to step 306.

On the other hand, if the start ratio is not greater than the second predetermined ratio, in step 326, the controller 128 determines whether the start ratio is less than a third predetermined ratio (i.e., a third ratio threshold), which is less than the second predetermined ratio. If the start ratio is less than the third predetermined ratio, in step 328, the controller 128 decreases the battery SOC limit by a predetermined amount of, for example, 1 amp-hour. More specifically, the controller 128 increases a current charge setpoint of the battery 120, and, therefore, decreases the battery SOC limit. Next, in step 324, the controller 128 stores the decreased battery SOC limit in the memory device 160 as the battery SOC limit. Then, the method 300 returns to step 306. If the controller 128 determines that start ratio is not less than the third predetermined ratio, however, the method 300 ends.

As an example, the predetermined start count may be in the range of 5 starts to 5000 starts, but the predetermined start count may be set to any number of starts. In addition, the first predetermined ratio may be 0.0175 starts to gallons of fuel consumed, the second predetermined ratio may be 0.0166 starts to gallons of fuel consumed, and the third predetermined ratio may be 0.0154 starts to gallons of fuel consumed. The first predetermined ratio, the second predetermined ratio, and the third predetermined ratio are not, however, limited to these values.

The battery SOC limit is used by the controller 128 during the engine idling reduction mode, and, in particular, is used in determining whether automatic shutdown conditions of the engine 102 are met. That is, as one condition of automatically shutting down the engine 102 when the engine 102 is in the engine idling reduction mode, the battery SOC must be, at a minimum or a limit, 95% charged, for example.

Although the method 300 is described as including step 302 to 328, the method 300 may not include all of these steps. For example, the method 300 may only include step 302, in which the engine 102 is started, step 308, in which the engine idling reduction mode is activated, steps 316 and 318, in which the controller 128 deactivates the engine idling reduction mode, thereby disallowing automatic shutdown of the engine 102, if the start ratio is greater than a first predetermined start ratio, and steps 320 to 328, relating to modifying the battery SOC limit based on the total start count.

Figure 4:
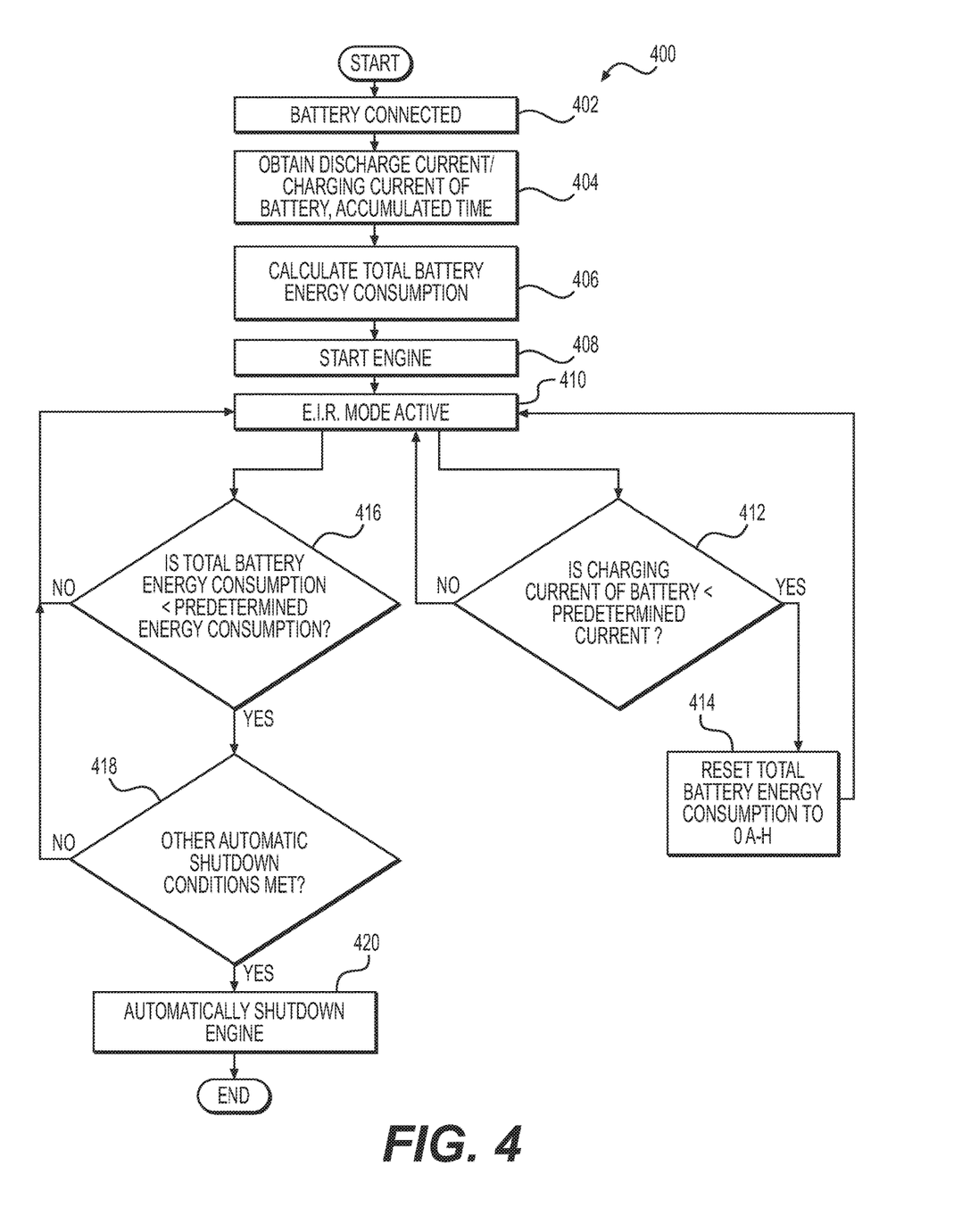
FIG. 4 shows a flowchart of a method for determining if batteries of the engine system are fully charged.

Referring to FIG. 4, a method 400 for determining whether the battery 120 is fully charged is described. The method 400 is used, in particular, to prevent deep discharge of the battery 120, which, in turn, prolongs a life of the battery 120. At least some of the steps of the method 400 are performed during the engine idling reduction mode, and ensure that the engine 102 will not automatically shut down during the engine idling reduction mode if a total battery energy consumption since a last full charge of the battery 120 is less than a threshold. In step 402, the battery 120 is connected to the controller 128, for example, when a key switch is turned on. Of course, the battery 120 may be connected to the controller 128 in another manner. In addition, although the battery 120 is connected to the controller 128, the engine 102 is not yet started. In step 404, the controller 128 obtains a discharge current, if the current is negative, or a charging current, if the current positive, from the current sensor 130, and a total time since the engine 102 was last turned off, or keyed off, as counted by the timer 150. In step 406, the controller 128 calculates a total battery energy consumption amount in amp-hours by multiplying the obtained discharge current by the obtained total time. The total time is an amount of time since a last full charge of the battery 120. The total battery energy consumption may, however, be calculated based on other amounts of time. In step 408, the engine 102 is started. In step 410, the engine idling reduction mode is active, in which the engine 102 is permitted to shutdown automatically, when specific conditions are met, as described above with respect to the method 300. In step 412, the controller 128 determines whether the obtained charging current is less than a predetermined charging current (i.e., a charging current threshold, which is a value indicating that the battery is fully charged). If the obtained charging current is less than the predetermined charging current, in step 414, the controller 128 resets the total battery energy consumption amount to 0 amp-hours, and returns to step 410. In one embodiment, for example, the predetermined charging current is in a range of 1 amp to 25 amps. The predetermined charging current is not, however, limited to this range.

In step 416, the controller 128 determines whether the total battery energy consumption amount is less than a predetermined energy consumption amount (i.e., an energy consumption threshold). For example, the predetermined energy consumption amount may be 500 amp-hours. The predetermined energy consumption amount is not, however, limited to 500 amp-hours. If the total battery energy consumption amount is not less than the predetermined energy consumption amount, the method 400 returns to step 410. If the total battery energy consumption amount is less than the predetermined energy consumption amount, in step 418, the controller 128 determines whether other automatic shutdown conditions in the engine idling reduction mode are met. The other automatic shutdown conditions may include:

1. the water jacket temperature output by the water jacket temperature sensor 140 is within a predetermined temperature range of, for example, 65° C. to 95° C.,
2. the battery state of charge (SOC) output by the current sensor 130 is greater than a predetermined value (i.e., a threshold battery SOC) of, for example, 95%,
3. a battery voltage output by a battery voltage sensor 132 is greater than a predetermined value (i.e., a threshold voltage) of, for example, 26.5 volts,
4. the total battery energy consumption amount calculated in step 406 is less than a predetermined consumption amount (i.e., a threshold consumption amount) of, for example, 200 amp-hours,
5. the transmission oil temperature output by the transmission oil temperature sensor 134 is greater than a predetermined oil temperature (i.e., a threshold transmission oil temperature) of, for example, 60° C.,
6. a pump lube temperature output by a pump lube temperature sensor is greater than a predetermined pump lube temperature (i.e., a threshold pump lube temperature) of, for example, 55° C.,
7. the exhaust temperature output by the exhaust temperature sensor 138 is less than a predetermined exhaust temperature (i.e., a threshold exhaust temperature) of, for example, 273° C.,
8. the start ratio, as calculated in step 314 of the method 300, is less than the first predetermined ratio of, for example, 0.0175 starts to gallons of fuel,
9. the ambient temperature output by the ambient temperature sensor 142 is greater than a minimum temperature (i.e., a threshold), and
10. the flag 152 indicating whether the last prelube was successful indicator is ON.

If all of the automatic shutdown conditions listed above are met, the controller 128 automatically shuts down the engine 102 in step 420, and the method 400 ends. In addition, the controller 128 may determine whether all of the automatic shutdown conditions listed above are met for a predetermined amount of time (i.e., a threshold time) before automatically shutting down the engine 102. In some embodiments, shutdown of the engine 102 may occur if some of the automatic shutdown conditions listed above are met.

Although the method 400 is described as including steps 402 to 420, the method 400 may not include all of these steps. For example, the method 400 may only include step 408, in which the engine is started, step 410, in which the engine idling reduction mode is activated, step 416, in which the controller 128 determines if the total battery energy consumption is less than a predetermined energy consumption (i.e., a threshold energy consumption), and step 420, in which the engine 102 is shutdown if the total battery energy consumption is less than the predetermined energy consumption.

Figure 5:
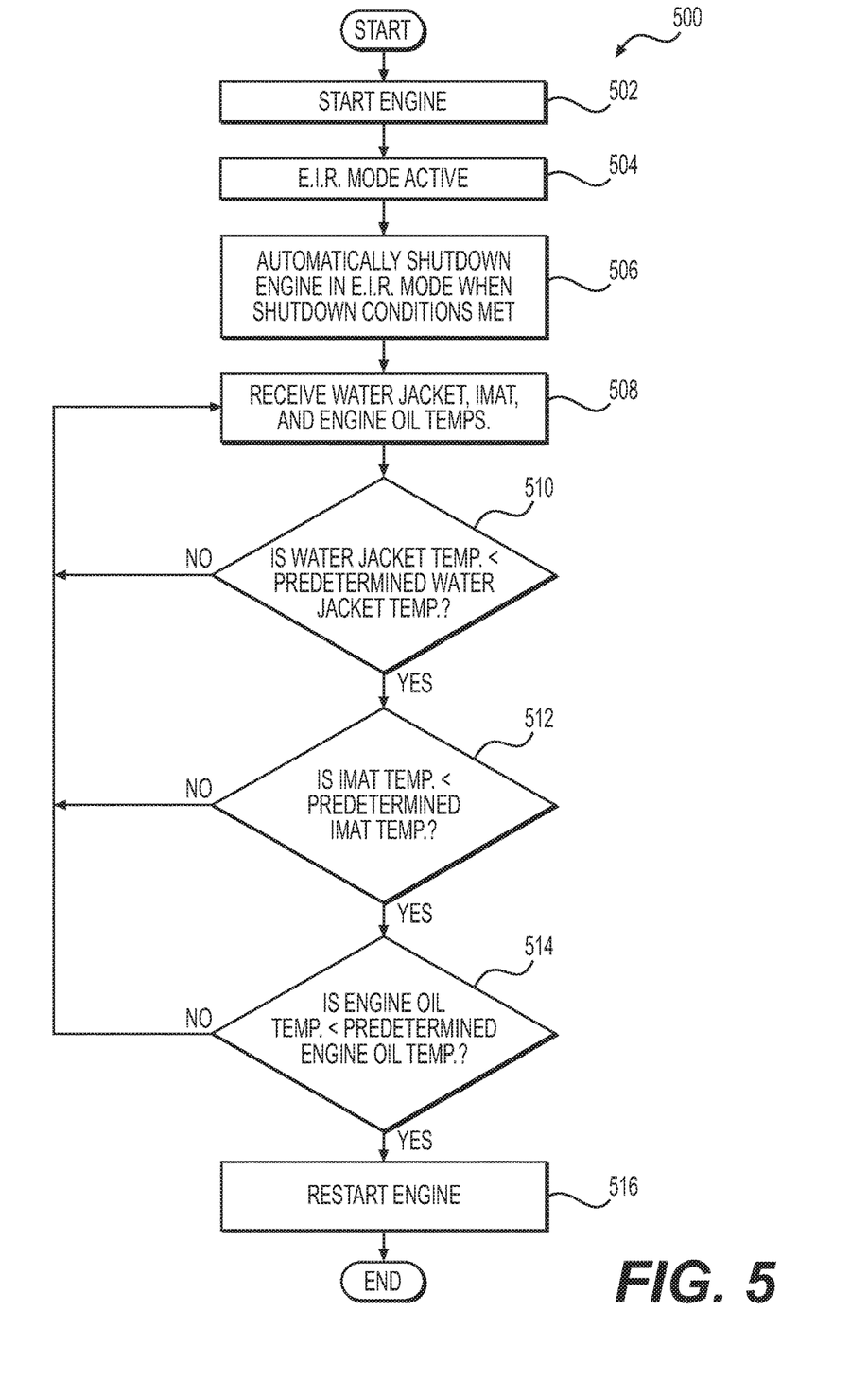
FIG. 5 shows a flowchart of a method for determining if the engine should restart if specific conditions are met.

Next, referring to FIG. 5, a method 500 of determining if an engine temperature is too low, and the engine 102 should restart after automatic shutdown, is described. The method 500 is used, in particular, when the engine idling reduction mode is active, and ensures that at least two indicators of engine temperature are less than corresponding thresholds before restarting the engine 102. In step 502, the engine 102 is started. In step 504, the controller 128 activates the engine idling reduction mode, in which the engine 102 is permitted to shutdown automatically, when specific conditions are met, as described above with respect to the method 300. In step 506, the controller 128 automatically shuts down the engine 102 when the automatic shutdown conditions are met, as noted above with respect to method 400. In step 508, the controller 128 receives the water jacket temperature output by the water jacket temperature sensor 140, the IMAT output by the IMAT sensor 136, and the engine oil temperature output by the engine oil temperature sensor 148. In step 510, the controller 128 determines whether the water jacket temperature is less than a predetermined water jacket temperature (i.e., a threshold water jacket temperature) of, for example, 40° C. If the water jacket temperature is not less than the predetermined water jacket temperature, the method 500 returns to step 508. If the water jacket temperature is less than the predetermined water jacket temperature, in step 512, the controller 128 determines whether the IMAT is less than a predetermined IMAT (i.e., a threshold IMAT) of, for example, 40° C. If the IMAT is not less than the predetermined IMAT, the method 500 returns to step 508. If the IMAT is less than the predetermined IMAT, in step 514, the controller 128 determines whether the engine oil temperature is less than a predetermined engine oil temperature (i.e., a threshold engine oil temperature) of, for example, 70° C. If the engine oil temperature is not less than the predetermined engine oil temperature, the method 500 returns to step 508. If the engine oil temperature is less than the predetermined engine oil temperature, the controller 128 exits the automatic shutdown by automatically restarting the engine 102 in step 516, and then the method 500 ends. During the automatic shutdown, while the controller 128 checks the above-noted temperatures, the engine 102 can automatically restart. Unless the controller 128 determines that all three of the above-noted temperatures are less than the corresponding predetermined values, the engine 102 will not automatically restart. In some embodiments, the controller 128 may require that only two of the three above-noted temperatures are less than the corresponding predetermined values before the engine 102 is automatically restarted.

The predetermined water jacket temperature, the predetermined IMAT, and the predetermined engine oil temperature are not limited to the values noted above. The predetermined water jacket temperature is preferably set by a user to be between 40° C. and 60° C. In a preferred embodiment, the predetermined water jacket temperature and the predetermined IMAT are the same value.

Although the method 500 is described as including steps 502 to 516, the method 500 may not include all of these steps. For example, the method 500 may only include step 502, in which the engine 102 is started, step 504, in which the engine idling reduction mode is active, step 508, at least two of steps 510, 512, and 514, and step 516, in which the controller 128 triggers an automatic restart of the engine 102 based on at least two of the indicators of engine temperature.

Figure 6:
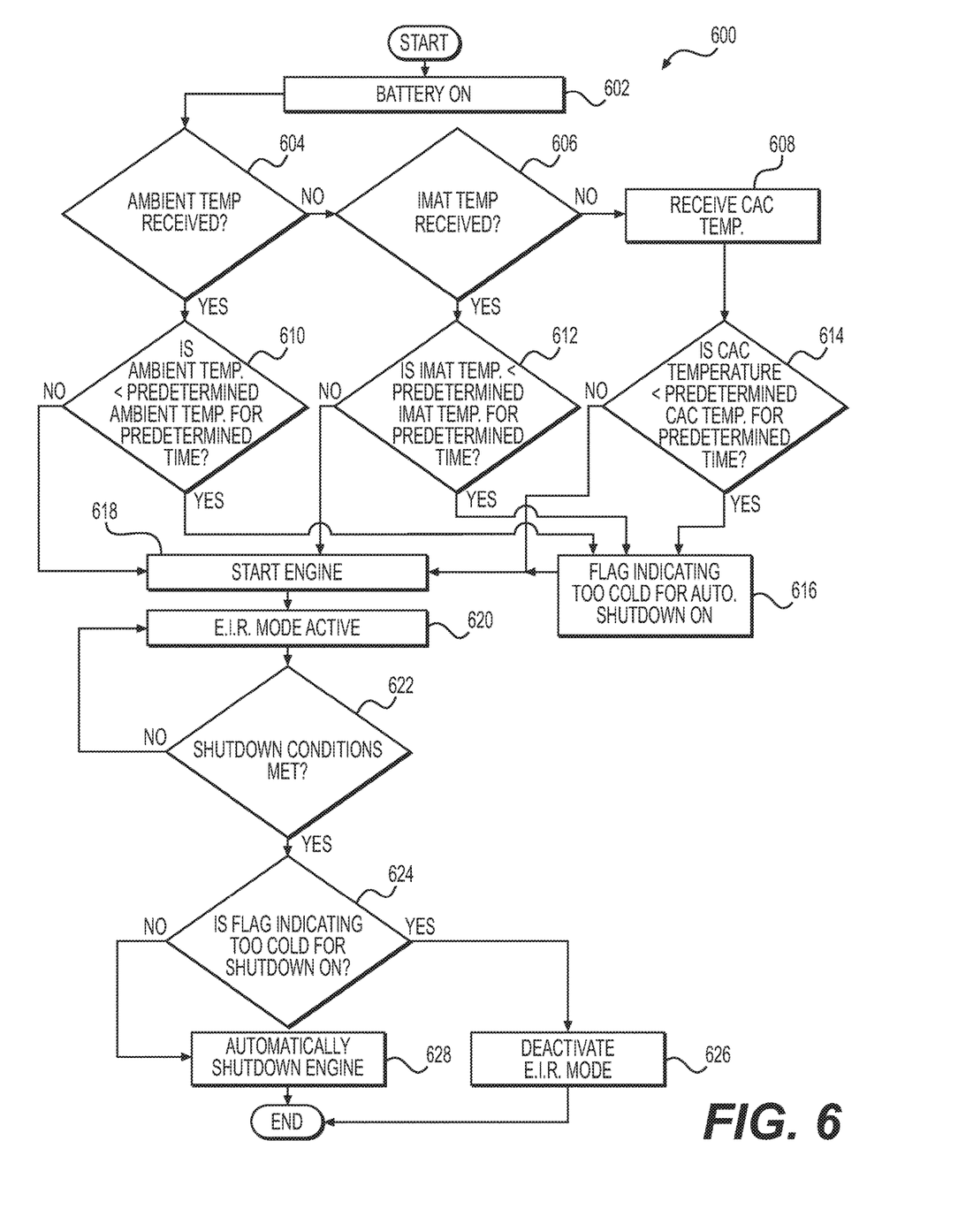
FIG. 6 shows a flowchart of a method for preventing automatic shutdown of the engine if specific conditions are met.

Referring to FIG. 6, a method 600 of preventing automatic shutdown of the engine 102 if specific temperature outputs are too low is described. The method 600 is used, in particular, in determining whether to enable automatic shutdown of the engine 102 during the engine idling reduction mode based on monitored temperatures. That is, if the controller 128 determines that a monitored temperature is less than a threshold, the controller 128 prevents automatic shutdown of the engine 102. In step 602, the battery 120 is connected to the controller 128. As noted above with respect to the method 400, the battery 120 is connected to the controller 128, for example, when a key switch is turned on. Of course, the battery 120 may be connected to the controller 128 in another manner. In addition, although the battery 120 is connected to the controller 128, the engine 102 is not yet started. In step 604, the controller 128 determines whether the ambient temperature is output by the ambient temperature sensor 142. Put another way, the controller 128 determines whether the ambient temperature is received from the ambient temperature sensor 142. If the ambient temperature is not output by the ambient temperature sensor 142, in step 606, the controller 128 determines whether the IMAT is output by the IMAT sensor 136. Put another way, the controller 128 determines whether the IMAT is received from the IMAT sensor 136. If the IMAT is not output by the IMAT sensor 136, in step 608, the controller 128 obtains the CAC temperature output by the CAC temperature sensor 144 in step 608, and, in step 614, determines whether the CAC temperature is less than a predetermined CAC temperature (i.e., a threshold CAC temperature) for a predetermined time (i.e., a threshold time) of, for example, 5 seconds.

If the ambient temperature is output by the ambient temperature sensor 142 in step 604, in step 610, the controller 128 determines whether the ambient temperature is less than a predetermined ambient temperature (i.e., a threshold ambient temperature) for a predetermined amount of time (i.e., a threshold time) of, for example, 5 seconds. If the IMAT is output by the IMAT sensor 136 in step 606, in step 612, the controller 128 determines whether the IMAT is less than a predetermined IMAT (i.e., a threshold IMAT) for a predetermined amount of time (i.e., a threshold time) of, for example, 5 seconds. If the controller 128 receives the CAC temperature in step 608, as noted above, in step 614, the controller 128 determines whether the CAC temperature is less than the predetermined CAC temperature for the predetermined amount of time of, for example, 5 seconds. If any one of the ambient temperature is less than the predetermined ambient temperature for the predetermined amount of time, the IMAT is less than the predetermined IMAT for the predetermined amount of time, or the CAC temperature is less than the predetermined CAC temperature for the predetermined amount of time, in step 616, the controller 128 sets a flag to ON, indicating that an engine temperature is too cold to permit automatic shutdown of the engine 102, and the method proceeds to step 618.

Then, in step 618, the engine 102 is started. In step 620, the s engine idling reduction mode is active, in which the engine 102 is permitted to shutdown automatically, when specific conditions are met, as described above with respect to the method 300. Then, in step 622, the controller 128 determines whether the automatic shutdown conditions, as noted above with respect to method 400, are met. If the shutdown conditions are not met, the method 600 returns to step 620. If the automatic shutdown conditions are met, in step 624, the controller 128 checks whether the flag, which indicates that the engine temperature is too cold to permit automatic shutdown of the engine 102, is ON. If the flag is ON, in step 626, the controller 128 deactivates the engine idling reduction mode, thereby disallowing automatic shutdown of the engine 102, and the method 600 ends. If the flag is not ON, in step 628, the controller 128 permits automatic shutdown of the engine 102, and the method 600 ends.

Although the method 600 is described as including steps 602 to 628, the method 600 may not include all of these steps. For example, the method 600 may only include step 618, in which the engine 102 is started, step 622, in which the engine idling reduction mode is active, steps 604 to 616, in which a state of the flag is set based on temperature outputs, step 624 in which the controller 128 determines the state of the flag, and step 626, in which the controller 128 deactivates the engine idling reduction mode, thereby disallowing automatic shutdown of the engine, if the flag is ON.

The engine idling reduction system 158 of the present disclosure allows for reduction of idle while maintaining engine readiness. The method 300 of the present disclosure determines whether a start limit is too high in order to help reduce excessive wear on components of the engine 102, first starter motor 124 or the second starter motor 126. The method 400 of the present disclosure helps to ensure the battery 120 is fully charged to help prevent deep discharge of the battery 120 and to help prolong battery life. The method 500 of the present disclosure determines whether an engine temperature is too low and the engine 102 should automatically restart. The method 600 of the present disclosure prevents automatic shutdown of the engine 102 if temperatures are too low, in order to help protect components of the engine system 100, including the first starter motor 124, the second starter motor 126, and the battery 120.

It will be apparent to those skilled in the art that various modifications and variations can be made to the disclosed system without departing from the scope of the disclosure. Other embodiments of the system will be apparent to those skilled in the art from consideration of the specification and practice of the lift capacity system disclosed herein. It is intended that the specification and examples be considered as exemplary only, with a true scope of the disclosure being indicated by the following claims and their equivalents.

What is claimed is:

1. A method for controlling an engine system having an engine and a voltage source, comprising:
   starting the engine system;
   activating an engine idling reduction mode allowing automatic shutdown and automatic restarting of the engine;
   disallowing automatic shutdown of the engine within the engine idling reduction mode if a value of a state of charge of the voltage source is below a state of charge limit for permitting automatic shutdown of the engine; and
   modifying the value of the state of charge limit as a function of a number of completed starts of the engine and a total fuel consumption of the engine.

2. The method of claim 1, wherein the modifying of the value of the state of charge limit includes both increasing and decreasing the value of the state of charge limit.

3. The method of claim 1, wherein the modifying of the value of the state of charge limit is performed when the number of starts is greater than a predetermined number of starts.

4. The method of claim 3, wherein the predetermined number of starts is within a range of 5 starts to 5000 starts.

5. The method of claim 1, further comprising automatically shutting down the engine within the engine idling reduction mode if at least one of the following conditions is met:
   a water jacket temperature is within a predetermined temperature range;
   the state of charge of the voltage source is greater than a predetermined value;
   a total energy consumption of the voltage source since a last full charge is less than a predetermined consumption amount;
   a transmission oil temperature is greater than predetermined transmission oil temperature;
   a pump lube temperature is greater than a predetermined pump lube temperature;
   an exhaust temperature is less than a predetermined exhaust temperature;
   a start ratio of a number of starts of the engine to the total fuel consumption of the engine is less than a first predetermined ratio;
   ambient temperature is greater than a minimum temperature; or
   a last prelube successful indicator is ON.

6. The method of claim 1, wherein the voltage source is a battery.

7. The method of claim 1, wherein the engine is operated over 40% in an idle condition during a work cycle.

8. A method for controlling an engine system having an engine and a voltage source, comprising:
   starting the engine system;
   activating an engine idling reduction mode allowing automatic shutdown of the engine;
   obtaining a discharge or charging current of the voltage source;
   obtaining a time since the voltage source was previously in a fully charged state;
   calculating a total energy consumption amount as a product of the obtained discharge or charging current and the obtained time since the voltage source was previously in the fully charged state;
   automatically shutting down the engine if the total energy consumption amount of the voltage source is less than a predetermined energy consumption amount; and
   triggering an automatic restarting of the engine, if the engine is automatically shutdown, based on at least two separate temperature measurements of engine temperature, the at least two separate temperature measurements being obtained at two separate respective locations in the engine.

9. The method of claim 8, further comprising determining if the voltage source is in the fully charged state, wherein the fully charged state includes the voltage source accepting less charging current than a predetermined charging current.

10. The method of claim 9, wherein the predetermined charging current is within a range of 1 amps to 25 amps.

11. The method of claim 8, further comprising allowing automatic shutdown of the engine within the engine idling reduction mode if at least one of the following conditions is met:
   a water jacket temperature is within a predetermined temperature range;
   a state of charge of the voltage source is greater than a predetermined value;
   a total energy consumption amount is less than a predetermined consumption amount;
   a transmission oil temperature is greater than predetermined transmission oil temperature;
   a pump lube temperature is greater than a predetermined pump lube temperature;
   an exhaust temperature is less than a predetermined exhaust temperature;
   a start ratio of a number of starts of the engine to a total fuel consumption of the engine is less than a first predetermined ratio;
   ambient temperature is greater than a minimum temperature; or
   a last prelube successful indicator is ON.

12. The method of claim 11, wherein the engine is automatically shut down if all of the conditions are met.

13. The method of claim 12, wherein the engine is automatically shut down if the conditions are met for a predetermined amount of time.

14. The method of claim 8, wherein the voltage source is a battery.

15. The method of claim 8, wherein the engine is operated over 40% in an idle condition during a work cycle.

16. A method for controlling an engine system having an engine and at least one voltage source, comprising:
   starting the engine system;
   activating an engine idling reduction mode allowing automatic shutdown and automatic restarting of the engine; and
   triggering an automatic restarting of the engine, if the engine is automatically shutdown, based on at least two separate temperature measurements of engine temperature, the at least two separate temperature measurements being obtained at two separate respective locations in the engine.

17. The method of claim 16, wherein the triggering of the automatic restarting of the engine is based on at least three separate temperature measurements of engine temperature, the at least three separate temperature measurements being obtained at three separate respective locations in the engine.

18. The method of claim 16, wherein the at least two separate temperature measurements include a jacket water temperature.

19. The method of claim 16, wherein the at least two separate temperature measurements include an intake manifold air temperature.

20. The method of claim 16, wherein the at least two separate temperature measurements include engine oil temperature.

21. A method for controlling an engine system having an engine and at least one voltage source, comprising:
   determining if a temperature condition for disallowing automatic shutdown is satisfied, the temperature condition including at least one of ambient temperature being less than a predetermined ambient temperature value and charge air cooling temperature being less than a predetermined charge air cooling temperature value;
   setting a flag to one of ON if the temperature condition is satisfied, or OFF if the temperature condition is not satisfied;
   starting the engine system;
   activating an engine idling reduction mode allowing automatic shutdown of the engine; and
   disallowing automatic shutdown of the engine within the engine idling reduction mode if the flag is set to ON.

22. The method of claim 21, wherein the temperature condition further includes an intake manifold air temperature being less than a predetermined intake manifold air temperature value.

\* \* \* \* \*